United States Patent
Nakayama

(10) Patent No.: US 9,905,831 B2
(45) Date of Patent: *Feb. 27, 2018

(54) CELL WIRING MODULE

(75) Inventor: Osamu Nakayama, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 180 days.

This patent is subject to a terminal disclaimer.

(21) Appl. No.: 14/114,822

(22) PCT Filed: Jun. 4, 2012

(86) PCT No.: PCT/JP2012/064384
§ 371 (c)(1),
(2), (4) Date: Oct. 30, 2013

(87) PCT Pub. No.: WO2013/008558
PCT Pub. Date: Jan. 17, 2013

(65) Prior Publication Data
US 2014/0072861 A1 Mar. 13, 2014

(30) Foreign Application Priority Data
Jul. 11, 2011 (JP) ................. 2011-152968

(51) Int. Cl.
H01M 2/20 (2006.01)

(52) U.S. Cl.
CPC ........... H01M 2/206 (2013.01); H01M 2/202 (2013.01)

(58) Field of Classification Search
CPC .......... H01M 2/20; H01M 2/206; H01M 2/24; H01M 2/202
See application file for complete search history.

(56) References Cited

U.S. PATENT DOCUMENTS 5,804,770 A * 9/1998 Tanaka ..................... 174/138 F
6,261,719 B1 7/2001 Ikeda et al.
(Continued)

FOREIGN PATENT DOCUMENTS

EP 2312674 4/2011
JP 11-86831 3/1999
(Continued)

OTHER PUBLICATIONS

Translation of JP 2009043637 A from AIPN—Online Translation.*
(Continued)

Primary Examiner — Nicholas P D'Aniello
(74) Attorney, Agent, or Firm — Greenblum & Bernstein, P.L.C.

(57) ABSTRACT

A cell wiring module includes a first unit holding one side of a connection member in a connection direction on a first base plate that extends along the connection member; and a second unit holding the other side of the connection member in the connection direction on a second base plate that extends along the connection member. Sliding occurs in the connection direction of the connection member between the connection member and at least one of the first unit and the second unit. The first base plate that extends to a second base plate side and the second base plate that extends to a first base plate side extend to such positions that the connection member is not exposed on a single cell side in an area between the first base plate and the second base plate.

9 Claims, 7 Drawing Sheets

(56) References Cited

U.S. PATENT DOCUMENTS

| | | |
|---|---|---|
| 7,611,798 B2 | 11/2009 | Yoon et al. |
| 2011/0081569 A1 | 4/2011 | Kim et al. |
| 2011/0104556 A1 | 5/2011 | Kim et al. |
| 2011/0117419 A1 | 5/2011 | Lee et al. |
| 2013/0280589 A1* | 10/2013 | Nakayama et al. ........... 429/158 |
| 2014/0065468 A1* | 3/2014 | Nakayama .................... 429/160 |

FOREIGN PATENT DOCUMENTS

| | | |
|---|---|---|
| JP | 2000-149909 | 5/2000 |
| JP | 2002-164034 | 6/2002 |
| JP | 2009043637 A * | 2/2009 |
| JP | 2009-252652 | 10/2009 |
| JP | 2011-82159 | 4/2011 |

OTHER PUBLICATIONS

Machine Translation of JP 11-86831 obtained May 31, 2017.*
Search report from International Search Report in PCT/JP2012/064384, dated Jul. 10, 2012.
Search report from E.P.O., dated Nov. 11, 2014.
Office Action issued in European Patent Office (EPO) Counterpart Patent Appl. No. 12810633.3, dated Dec. 21, 2017.

* cited by examiner

CELL WIRING MODULE

FIELD OF THE INVENTION

The present invention relates to a cell wiring module.

BACKGROUND OF THE INVENTION

A battery module for an electric automobile or a hybrid car is configured by arranging a plurality of single cells each of which includes a flat-shaped main body having a power generating element therein and electrode terminals including a positive electrode and a negative electrode. By using a connection member (busbar) to connect electrode terminals of adjacent single cells, the plurality of the single cells are connected in parallel or in series.

Here, the following Patent Literature 1 discloses a battery-connecting plate that is configured by incorporating a plurality of busbars by insert molding on a base plate made of synthetic resin. By attaching the battery-connecting plate to a plurality of single cells, the plurality of the busbars are integrally connected.

Here, when attaching the battery-connecting plate (cell wiring module) to the single cells, it is necessary to prevent a problem from occurring due to a dimensional error in an electrode pitch.

In the configuration disclosed in Patent Document 1, in order to prevent the problem from occurring when attaching the battery-connecting plate to the single cells due to the dimensional error in the electrode pitch, a pitch adjustment means is provided on the base plate of the battery-connecting plate (cell wiring module) and the dimensional error in the electrode pitch is offset by the pitch adjustment means.

RELATED ART

Patent Literature

Patent Literature 1: Japanese Patent Laid-Open Publication No. 2000-149909.

SUMMARY OF THE INVENTION

Problems to be Solved by the Invention

Here, in the pitch adjustment means disclosed in Patent Document 1, a plurality of slits perpendicular to a longitudinal direction of the base plate are formed. However, when the pitch adjustment means is provided only by a configuration of the base plate as in the case where the slits are formed in the base plate, there is a concern that strength of the base plate may be insufficient.

The present invention is accomplished in view of the above-described problem. A purpose of the present invention is to provide a cell wiring module capable of preventing a problem from occurring when attaching the cell wiring module to single cells.

Means for Solving the Problems

A cell wiring module according to the present invention is attached to a bank of single cells that is configured by arranging a plurality of single cells, each of which has electrode terminals including a positive electrode and a negative electrode. The cell wiring module includes a connection member that connects the electrode terminals of adjacent single cells; a first unit that holds one side of the connection member in a connection direction on a first base plate that extends along the connection member; and a second unit that holds the other side of the connection member in the connection direction on a second base plate that extends along the connection member. Sliding occurs in the connection direction of the connection member between the connection member and at least one of the first unit and the second unit, and the first base plate that extends to a second base plate side and the second base plate that extends to a first base plate side extend to such positions that the connection member is not exposed on an single cell side in an area between the first base plate and the second base plate.

According to the present configuration, even when a dimensional error occurs between the single cells and the cell wiring module, since sliding occurs in the connection direction of the connection member between the connection member and at least one of the first unit and the second unit, the dimensional error between the single cells and the cell wiring module can be absorbed by the sliding between the at least one of the first unit and the second unit and the connection member. Therefore, the problem that occurs due to a dimensional error and the like when attaching the cell wiring module to the single cells can be prevented. Further, in this configuration, the dimensional error is not absorbed only by configurations of the first unit and the second unit. Therefore, as compared to the case where a configuration for absorbing the dimensional error is provided only in the first unit and the second unit, loss of strength of the first unit and the second unit can be inhibited.

Further, the first base plate that extends to the second base plate side and the second base plate that extends to the first base plate side extend with respect to each other to such positions that the connection member is not exposed to the single cell side. Therefore, deterioration in insulation performance due to exposure of the connection member to the single cell side can be prevented.

It is more preferable to have the following configurations in addition to the above configuration.

A receiver is formed on one of the first base plate and the second base plate for receiving the other one of the first base plate and the second base plate from the single cell side.

In this way, the single cell side of the connection member can be insulated with a simple configuration. Further, even when the at least one of the first unit and the second unit and the connection member slide relative to each other in a direction in which the first base plate and the second base plate move away from each other, for a range in which the receiver overlaps the connection member in the connection direction, the connection member can be prevented from being exposed to the single cell side. Therefore, deterioration in insulation performance due to exposure of the connection member to the single cell side can be inhibited.

A pair of opposing walls are formed from both side edges of each of the base plates, and the connection member is arranged between the pair of the opposing walls.

In this way, due to the pair of the opposing walls, insulation of the connection member from the outside can be reliably performed.

An engaged portion is provided on the connection member, and an engaging portion is provided on at least one of the first unit and the second unit for engaging the engaged portion with a predetermined clearance in the connection direction of the connection member.

For example, after the units are fixed to the single cells by parts other than the connection member, the connection member can slide within a range of the predetermined clearance. Therefore, even when a dimensional error occurs, since the connection member can be moved within the range of the predetermined clearance in the connection direction, work for attaching the connection member can be easily performed.

A positioner is provided on the first unit and the second unit for positioning with respect to the single cells.

The positioner positions the first unit and the second unit. Therefore, with these positions as a reference, a dimensional error occurring between the single cells and the units can be absorbed by the sliding between the first unit and the second unit and the connection member. Therefore, the connection member can be fastened after the dimensional error is resolved by the sliding during the positioning.

A fitting projection projecting in the connection direction of the connection member is provided on one of the first unit and the second unit, and a fitting recess to be fitted with the fitting projection is provided on the other one of the first unit and the second unit.

In this way, by fitting the fitting projection and the fitting recess with each other, positioning and inhibiting flexible deformation between the units can be easily performed.

The connection member is fixed to the single cells by inserting into a through hole a rod-shaped terminal or a shaft portion of a bolt. The through hole has a shape of an oval that is long in the connection direction of the connection member.

The through hole of the connection member has a shape of an oval that is long in the connection direction of the connection member. Therefore, even when there is a dimensional error due to variation in dimensional precision between terminals, it is possible to absorb the dimensional error and insert the rod-shaped electrode terminal or the shaft portion of the bolt into the through hole of the connection member.

The plurality of the single cells have a flat shape and are arranged in a long axis direction in a plane having the electrode terminals, and the connection member connects adjacent electrode terminals in the long axis direction.

For the long axis direction of the single cells, since variation in dimensional precision is particularly likely to occur due to a length in that direction, a dimensional error between the plurality of the single cells and the cell wiring module is likely to become large. However, according to the present embodiment, in a case where such a dimensional error is likely to occur, a problem due to the dimensional error can be prevented.

The plurality of the single cells are also arranged in a short axis direction in the plane having the electrode terminals, and the connection member connects the electrode terminals arranged in the short axis direction.

In this way, a degree of freedom in connecting the plurality of the single cells can be increased.

Effect of the Invention

According to the present invention, a cell wiring module can be provided capable of preventing a problem from occurring when attaching the cell wiring module to single cells.

MODE FOR CARRYING OUT THE INVENTION

First Embodiment

In the following, an embodiment of the present invention is described with reference to FIGS. 1-8.

Figure 1:
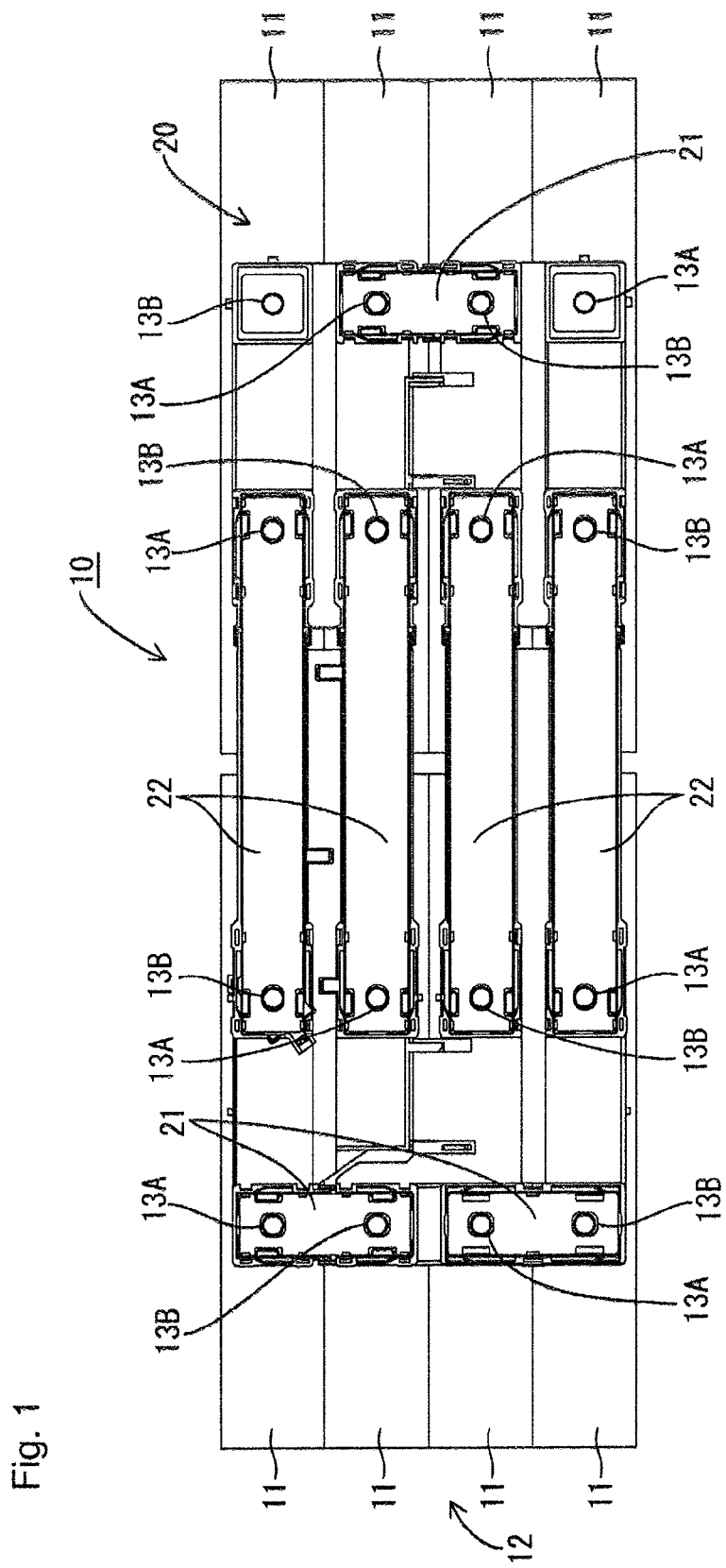
FIG. 1 illustrates a plan view of a battery module according to a first embodiment.

As illustrated in FIG. 1, a cell wiring module 20 of the present embodiment is attached to a bank of single cells 12 that is configured by arranging a plurality of single cells 11, and electrically connects electrode terminals 13A, 13B of adjacent single cells 11 using connection members 21, 22. A battery module 10 to which the cell wiring module 20 is attached is used, for example, as a drive source of a vehicle such as an electric automobile or a hybrid car. In the following description, a lower side in FIG. 1 is a front side and an upper side in FIG. 1 is a rear side for a front-rear direction, while a near face of the sheet of FIG. 1 is treated as upward and a far face of the sheet of FIG. 1 is treated as downward for a vertical direction.

(Battery Module 10)

As illustrated in FIG. 1, the battery module 10 is configured to include the bank of single cells 12 that is configured by arranging, for example, eight (a plurality of) single cells 11, and the cell wiring module 20 that is attached to the bank of single cells 12.

(Bank of Single Cells 12)

The bank of single cells 12 is configured such that the single cells 11 are stacked in four rows (a plurality of rows) in the front-rear direction (a short axis direction of an upper surface of the single cell 11) and are arranged in two columns (a plurality of columns) in a left-right direction (a long axis direction of the upper surface of the single cell 11).

Each of the single cells 11 has a pair of left and right electrode terminals 13A, 13B (a positive electrode is denoted by 13A and a negative electrode is denoted by 13B in the drawing) that perpendicularly project from an upper surface of a main body having a shape of a flat rectangular cuboid inside which a power generating element (not illustrated in the drawing) is housed.

Each of the electrode terminals 13A, 13B is formed as an angular tubular nut (square nut) having a circular screw hole formed through a center of the nut. By screwing a shaft portion of a bolt to each of the electrode terminals 13A, 13B, the connection members 21, 22 are fixed on the single cells 11.

Orientation of each of the single cells 11 is arranged such that polarities of adjacent electrode terminals 13A, 13B are opposite to each other. The bank of single cells 12 is fixed by a holding plate (not illustrated in the drawings).

(Cell Wiring Module 20)

Figure 2:
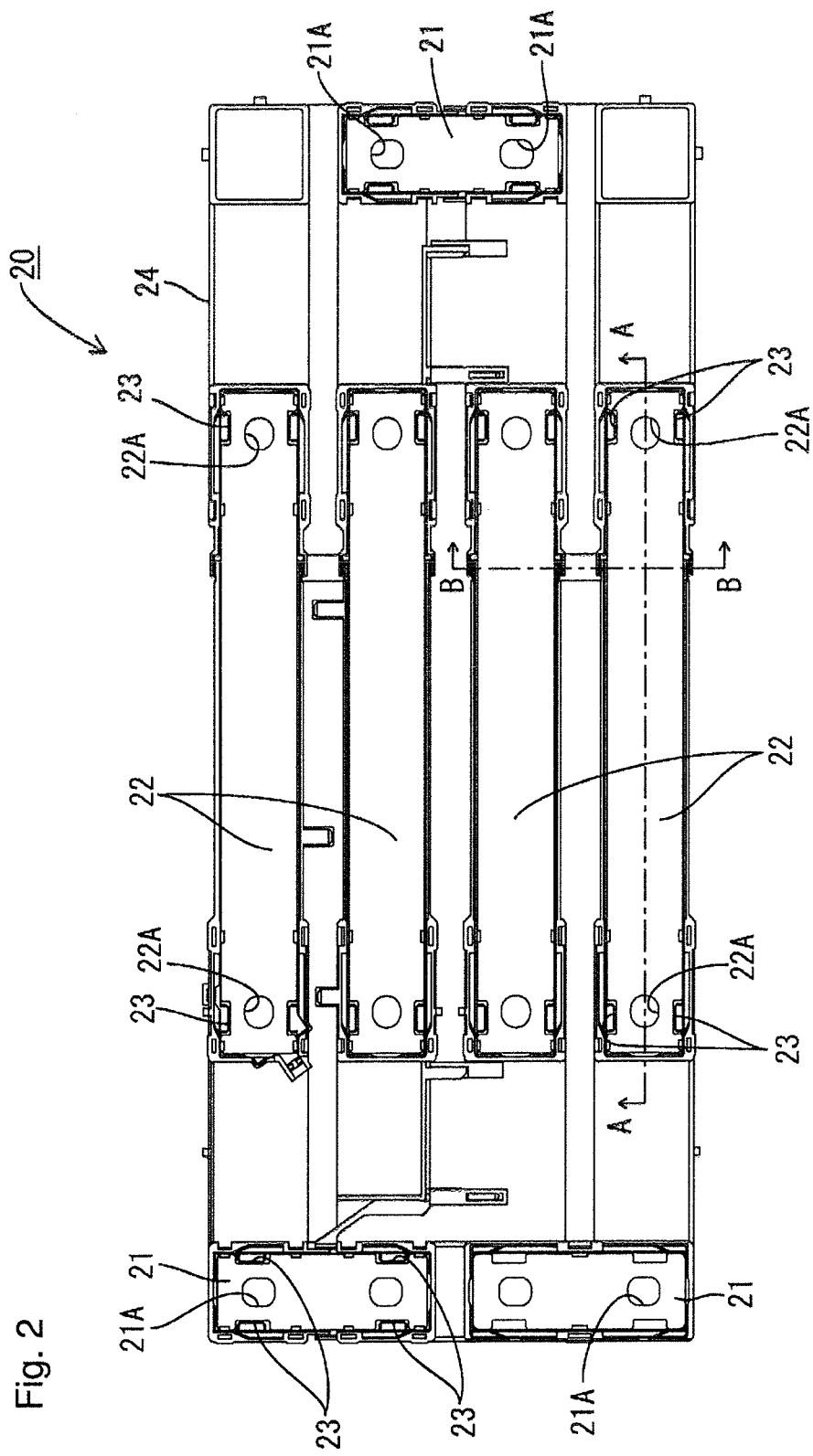
FIG. 2 illustrates a plan view of a cell wiring module.
Figure 3:
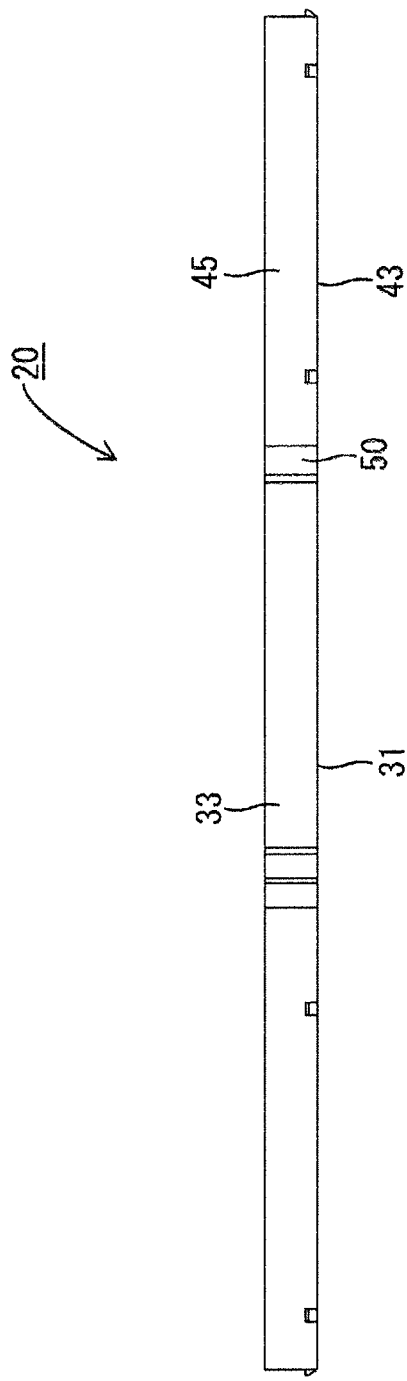
FIG. 3 illustrates a front view of the cell wiring module.

As illustrated in FIG. 2, the cell wiring module 20 includes a plurality of the connection members 21, 22 that connect electrode terminals 13A, 13B of adjacent single cells 11, and a holder member 24 made of synthetic resin that holds the plurality of the connection members 21, 22.

(Connection Members 21, 22)

The plurality of the connection members 21, 22 include a plurality of short connection members 21 (FIG. 6) that connect the electrode terminals 13A, 13B of different adjacent single cells 11 in the front-rear direction (the short axis direction of the upper surface of the single cell 11), and a plurality of long connection members 22 (FIG. 7) that are longer than the short connection members 21 and connect the electrode terminals 13A, 13B of different adjacent single cells 11 in the left-right direction (the long axis direction of the upper surface of the single cell 11).

The connection members 21, 22 are both made of metal such as copper, copper alloy, stainless steel (SUS) and aluminum, each having a plate-like shape with a length corresponding to a dimension between adjacent electrode terminals 13A, 13B, and each having a pair of through holes 21A, 22A (an example of a "through hole" that is a configuration component of the present invention) (being communicated with the screw holes of the electrode terminals 13A, 13B) formed therethrough into each of which a shaft portion of a bolt can be inserted.

The through holes 21A, 22A are each formed in an oval shape that is long in a left-right direction (connection direction).

On side edges of the connection members 21, 22 in the connection direction, engaged recess 23 (an example of an "engaged portion" that is a configuration component of the present invention) that are each formed by cutting out a rectangular (step-shaped) portion on the side edge (by narrowing a width-wise dimension of each of the connection members 21, 22 into a stepped shape) are respectively formed on both sides of each of the through holes 21A, 22A. Moreover, corners where the engaged recesses 23 constrict in the step shape have a slightly tapered shape.

(Holder Member 24)

Figure 8:
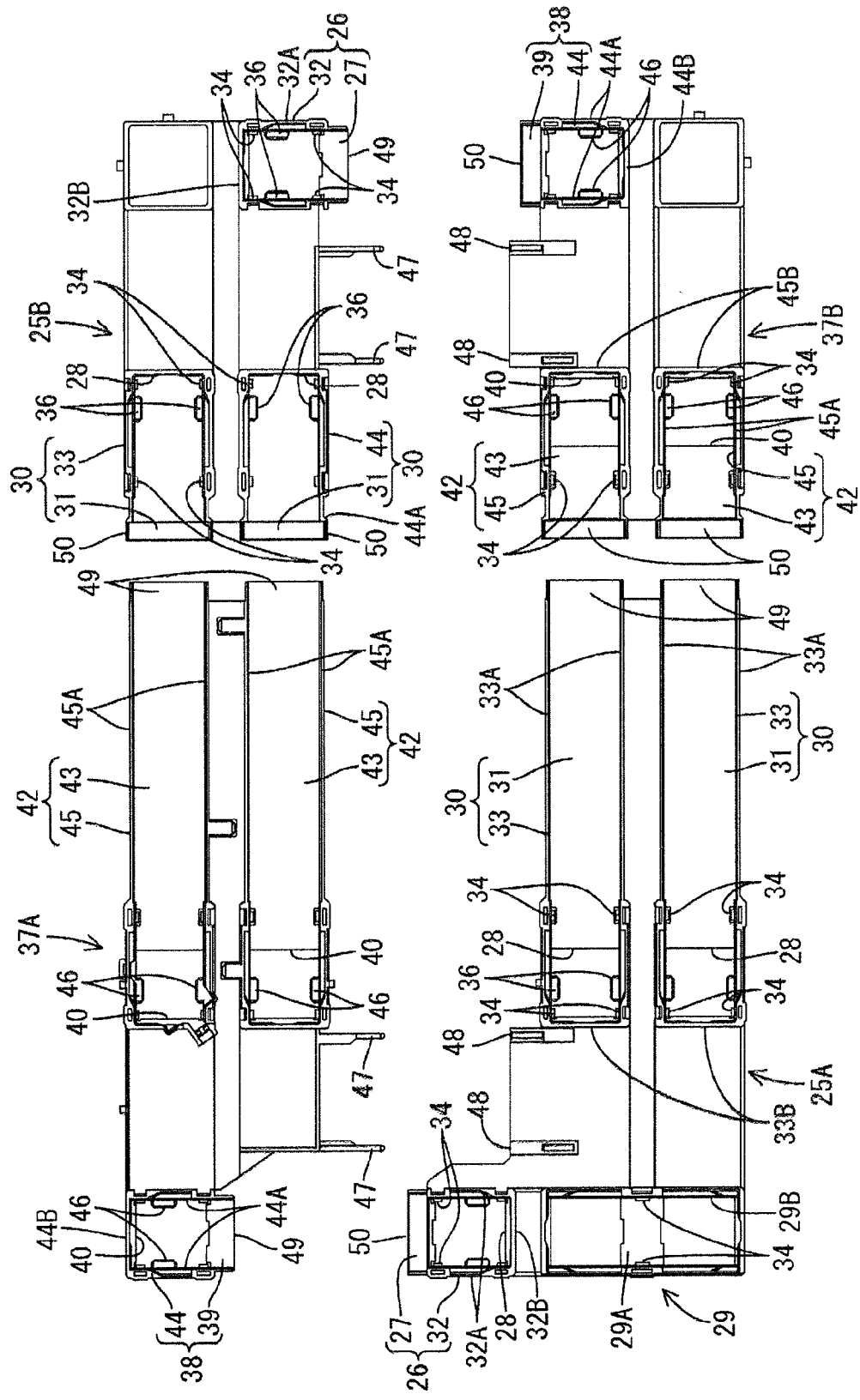
FIG. 8 illustrates a plan view of a first unit and a second unit.

As illustrated in FIG. 8, the holder member 24 is configured by combining (fitting) two (a plurality of) first units 25A, 25B and two (a plurality of) second units 37A, 37B, which are arranged such that the first unit 25A and the second units 37A, 37B are adjacent each other and the second units 37A, 37B and the first unit 25B are adjacent each other.

(First Units 25A, 25B)

The first units 25A, 25B are both provided with a plurality of first holders 26, 30 holding one side of each of the connection members 21, 22.

The plurality of the first holders 26, 30 include a short holder 26 holding one side of the short connection member 21 in the connection direction and a plurality of long holders 30 holding one side of the long connection members 22 in the connection direction. The short holder 26 and the long holders 30 are arranged orthogonal to each other.

The short holder 26 has a first base plate 27 that extends in the front-rear direction (the connection direction of the connection member 21) and on which the short connection member 21 is mounted, and a first dividing wall 32 that surrounds three sides of the short connection member 21 and has one side open in the connection direction of the short connection member 21. The long holder 30 has a first base plate 31 that extends in the left-right direction (the connection direction of the connection member 22) and on which the long connection member 22 is mounted, and a first dividing wall 33 that surrounds three sides of the long connection member 22 and has one side open in the connection direction of the long connection member 22.

Of the first holder 26, 30, a portion where an end of the connection member 21, 22 is arranged is an opening 28 where the first base plate 27, 31 is not formed. The electrode terminal 13A, 13B enters from the opening 28.

Figure 4:
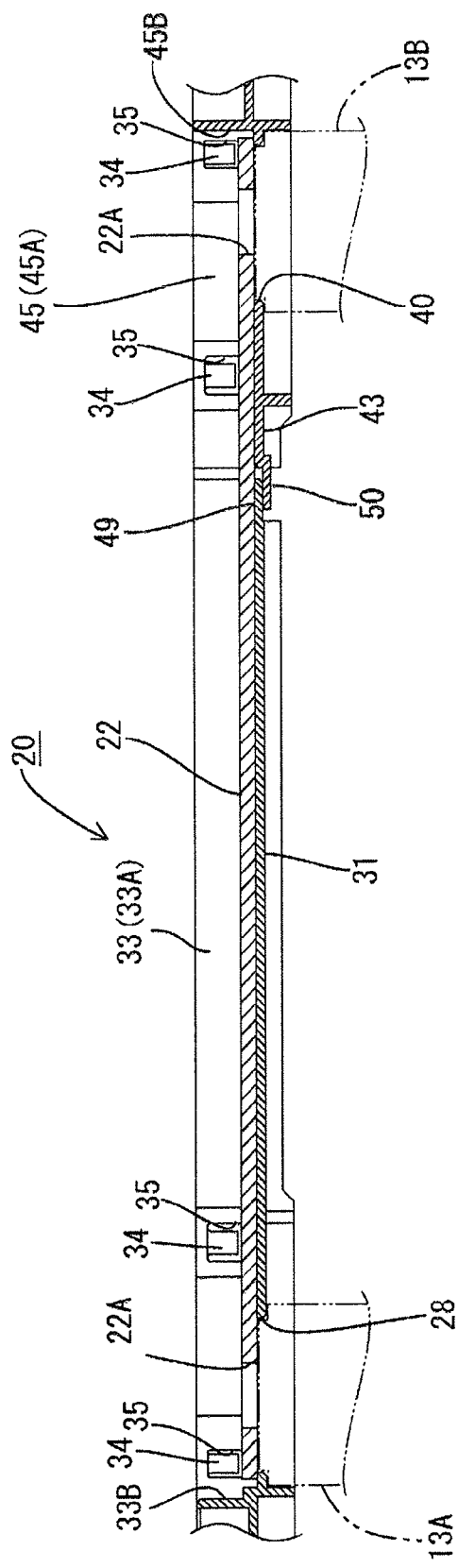
FIG. 4 illustrates a cross-sectional view along a line A-A of FIG. 2.

Further, as illustrated in FIG. 4, the opening 28 is adapted to fit the angular tubular electrode terminal 13A, 13B into an edge of the opening 28. When the electrode terminal 13A, 13B is fitted into the opening 28, the first unit 25A is positioned with respect to the single cell 11 (the electrode terminal 13A, 13B of the single cell 11). Therefore, the edge of the opening 28 is an example of a "positioner" that is a configuration component of the present invention.

The first dividing walls 32, 33 are both formed in a height that can prevent short circuit due to contact of a tool or the like with the electrode terminals 13A, 13B and the connection member 21, 22, and each include a pair of front and rear opposing walls 32A, 33A and a side wall 32B, 33B connecting the pair of opposing walls 32A, 33A on only one end side.

On inner sides of the first dividing wall 32, 33 (the opposing walls 32A, 33A of the first dividing wall 32, 33), separation regulating pieces 34 regulating separation of the connection member 21, 22 are provided above side edges of the connection member 21, 22. The separation regulating pieces 34 are formed to have a thick front end side and project in a tab shape toward inner side of the first dividing wall 32, 33. By providing squared U-shaped cut-out portions 35 on the first dividing wall 32, 33, the separation regulating pieces 34 can be flexibly deformed.

Each of the separation regulating pieces 34 is not in contact with the connection member 21, 22, but may also be configured to be in contact with the connection member 21, 22 to engage the connection member 21, 22 from above. In this case, the engagement strength between the separation regulating piece 34 and the connection member 21, 22 is set to a level at which the connection member 21, 22 is not separated and is slidable in the connection direction.

Further, as illustrated in FIG. 8, on the inner sides of the dividing wall 32, 33 (the opposing walls 32A, 33A of the dividing wall 32, 33) and at positions of the same height as the connection member 21, 22, engaging projections 36 are provided to inwardly project and to engage with the engaged recess 23 of the connection member 21, 22, thereby allowing movement (positional displacement) of the connection member 21, 22 in the connection direction within a predetermined range (range of clearance).

The engaging projections 36 are formed at positions corresponding to the engaged recess 23 of the connection member 21, 22. A projection dimension of the engaging projection 36 is slightly smaller than a cut-out depth dimension of the engaged recess 23. Corners of the engaging projection 36 are taken off so that the engaging projection 36 has a tapered shape.

Here, a dimension of the engaging projection 36 in the left-right direction (length of the engaging projection 36 in the connection direction of the connection member 21, 22) is slightly shorter than a dimension of the engaged recess 23 in the left-right direction (length of the engaged recess 23 in the connection direction of the connection member 21, 22). Due to the clearance (gap) between the engaged recess 23 and the engaging projection 36 that is provided by the difference between the dimensions in the left-right direction, the connection member 21, 22 is slidable with respect to the first unit 25A, 25B within the range of the clearance in the connection direction of the connection member 21, 22.

Further, a housing part 29 housing the entire short connection member 21 is provided in the first unit 25A. The housing part 29 has a housing base plate 29A on which the short connection member 21 is mounted, an angular tubular dividing wall 29B surrounding the whole circumference of the short connection member 21, and a pair of the separation regulating pieces 34 regulating separation of the short connection member 21.

Although not illustrated in the drawings, an external connection terminal for connecting to a terminal of a wire connected to an external inverter or the like is installed in the first unit 25B at a portion where the electrode terminals 13A, 13B of an end of a series connection of the single cells 11 are arranged.

(Second Units 37A, 37B)

The second units 37A, 37B are provided with a plurality of second holders 38, 42 holding the other side of each of the connection members 21, 22.

The plurality of the second holders 38, 42 include a short holder 38 holding one side of the short connection member 21 in the connection direction and long holders 42 holding one side of the long connection members 22 in the connection direction. The short holder 38 and the long holders 42 are arranged orthogonal to each other.

The second holder 38 has a second base plate 39 that extends in the front-rear direction (the connection direction of the short connection member 21) and on which the short connection member 21 is mounted, and a second dividing wall 44 that surrounds three sides of the short connection member 21 and has one side open in the connection direction of the short connection member 21. The second holder 42 has a second base plate 43 that extends in the left-right direction (the connection direction of the long connection member 22) and on which the long connection member 22 is mounted, and a second dividing wall 45 that surrounds three sides of the long connection member 22 and has one side open in the connection direction of the long connection member 22.

Of the second holder 38, 42, a portion where an end of the connection member 21, 22 is arranged is an opening 40 where the second base plate 39, 43 is not formed. The electrode terminal 13A, 13B enters from the opening 40.

Further, as illustrated in FIG. 4, the opening 40 can fit the angular tubular electrode terminal 13A, 13B into an edge of the opening 40 to engage the electrode terminal 13A, 13B. When the electrode terminal 13A, 13B is fitted into the opening 28, the second unit 37A, 37B is positioned with respect to the single cell 11 (the electrode terminals 13A, 13B of the single cell 11). Therefore, the edge of the opening 40 is an example of a "positioner" that is a configuration component of the present invention.

The second dividing walls 44, 45 are formed in a height that can prevent short circuit due to contact of a tool or the like with the electrode terminals 13A, 13B and the connection member 21, 22, and each include a pair of front and rear opposing walls 44A, 45A and a side wall 44B, 45B connecting the pair of opposing walls 44A, 45A on only one end side.

On inner sides of the second dividing wall 44, 45, separation regulating pieces 34 regulating separation of the connection member 21, 22 are provided above side edges of the connection member 21, 22. The separation regulating pieces 34 are formed to have thick front end sides and project in a tab shape toward inner side of the second dividing wall 44, 45. By providing squared U-shaped cut-out portions 35 on the second dividing wall 44, 45, the separation regulating pieces 34 can be flexibly deformed.

Further, as illustrated in FIG. 8, on the inner sides of the second dividing wall 44, 45 and at positions of the same height as the connection member 21, 22, engaging projections 46 are provided that, by engaging the engaged recess 23 of the connection member 21, 22, allow movement (positional displacement) of the connection member 21, 22 in the connection direction within a predetermined range (range of clearance).

The engaging projections 46 are formed at positions corresponding to the engaged recess 23 of the connection member 21, 22. A projection dimension of the engaging projection 46 is slightly smaller than the cut-out depth dimension of the engaged recess 23. Corners of corner portions of the engaging projection 36 are taken off so that the engaging projection 46 has a tapered shape.

Here, a dimension of the engaging projection 46 in the left-right direction (length of the engaging projection 46 in the connection direction of the connection member 21, 22) is slightly shorter than the dimension of the engaged recess 23 in the left-right direction (length of the engaged recess 23 in the connection direction of the connection member 21, 22). Due to the clearance (gap) between the engaged recess 23 and the engaging projection 46 that is provided by the difference between the dimensions in the left-right direction, the connection member 21, 22 is slidable with respect to the second unit 37A, 37B within the range of the clearance in the connection direction.

Although not illustrated in the drawings, an external connection terminal for connecting to a terminal of a wire connected to an external inverter or the like is installed in the second unit 37B at a portion where the electrode terminals 13A, 13B of an end of a series connection of the single cells 11 are arranged.

Further, on the connection members 21, 22 attached to the holder member 24, although not illustrated in the drawings, a flat plate-shaped voltage detection terminal is stacked on one side of each of the connection members 21, 22 in the connection direction for detecting voltage of the single cell 11. An electric wire for voltage detection is connected to the voltage detection terminal by crimping. The electric wire for voltage detection is connected to a battery ECU (not illustrated in the drawings) through gaps between the holders 26, 30, 38, 42. The battery ECU is provided with a microcomputer, an element and the like, and has a commonly known configuration provided with a function for performing detection of voltage, current, temperature and the like of the single cells 11 and performing charging and discharging control and the like of each of the single cells 11.

(Configuration for Positioning and Inhibiting Flexible Deformation Between the First Unit 25A and the Second Unit 37A and Between the First Unit 25B and the Second Unit 37B)

As illustrated in FIG. 8, on a rear end of each of the first unit 25B and the second unit 37A (one of the first units and one of the second units), a fitting projection 47 projecting rearwardly is provided. On the other hand, on a front end of each of the first unit 25A and the second unit 37B (the other first unit and the other second unit), a fitting recess 48 to be fitted with the fitting projection 47 is provided. The fitting projection 47 includes a pair of rod-shaped members each of which forms a flat shape that is thick in the up-down direction and thin in the left-right direction. The fitting recess 48 is formed in a depth and size that allow the fitting projection 47 to be insertedly fitted until front ends of the fitting projection 47 abuts against the fitting recess 48.

(Configuration for Ensuring Insulation Performance of the Connection Member 21, 22 with Respect to an Single Cell 11 Side)

Next, a configuration for ensuring insulation performance of the connection member 21, 22 with respect to an single cell 11 side is described.

At each of portions where the first holders 26, 30 of the first units 25A, 25B and the second holders 38, 42 of the second units 37A, 37B that are provided corresponding to the first holders 26, 30 connect with each other, a receiver 50 is provided for an end on one side to receive an end on the other side.

The receiver 50 is provided on either the first holder 26, 30 of the first unit 25A, 25B or the second holder 38, 42 of the second unit 37A, 37B that corresponds to the first holder 26, 30, and receives an end 49 (end of the base plate 27, 31, 39, 43 and dividing wall 32, 33, 44, 45) of the other side from outside.

Figure 5:
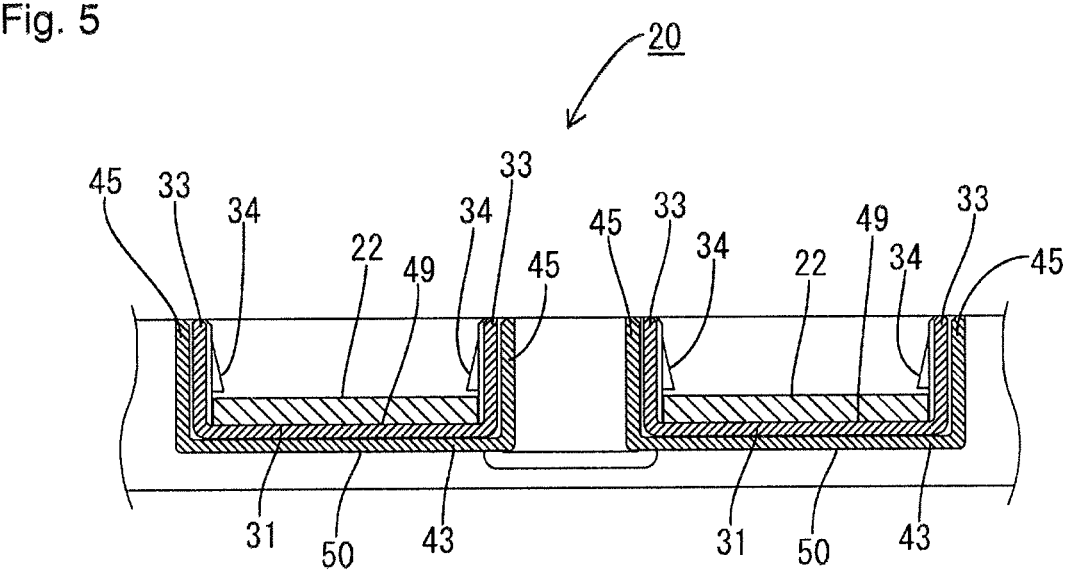
FIG. 5 illustrates a cross-sectional view along a line B-B of FIG. 2.
Figure 6:
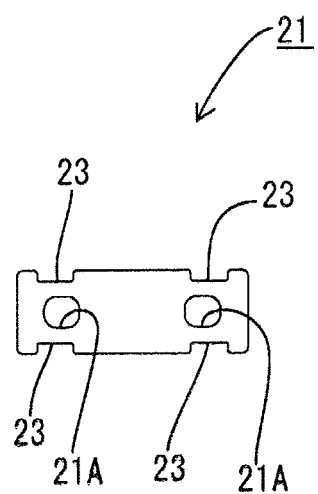
FIG. 6 illustrates a plan view of a short connection member.
Figure 7:
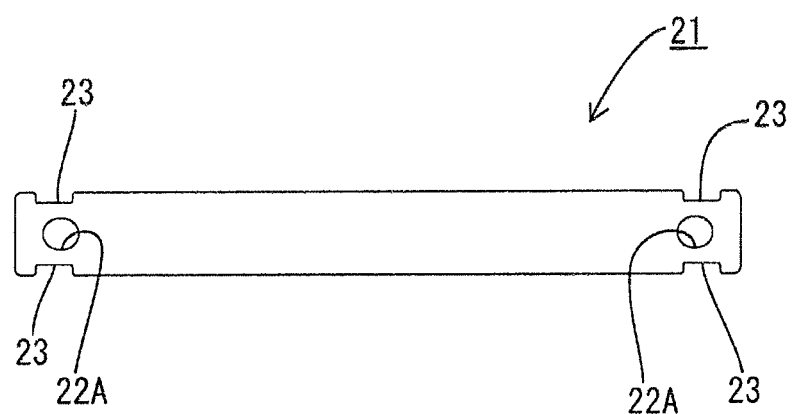
FIG. 7 illustrates a plan view of a long connection member.

More specifically, the receiver 50 is formed by enlarging into a stepped shape an inner side of a squared U-shaped cross section formed by the first base plate 27, 31 and the first dividing wall 32, 33 or by the second base plate 39, 43 and the second dividing wall 44, 45. As illustrated in FIG. 5, the receiver 50 and the end 49 on the other side are formed in sizes such that the end 49 (end of the base plate 27, 31, 39, 43 and the dividing wall 32, 33, 44, 45) of the holder 26, 30, 38, 42 on the other side is fitted almost without gap into interior of the receiver 50 provided on an end (end of the base plate 27, 31, 39, 43 and the dividing wall 32, 33, 44, 45) of the holder 26, 30, 38, 42 on one side. In the connection direction of the connection member 21, 22, as the end 49 (of the base plate 27, 31, 39, 43 and the dividing wall 32, 33, 44, 45) of the holder 26, 30, 38, 42 on the other side is fitted into the receiver 50, when a corner portion of the end 49 abuts against a stepped portion of the receiver 50, further fitting into the receiver 50 is restricted.

Here, a length of the receiver 50 in the connection direction of the connection member 21, 22 is set according to the clearance that is determined by the engagement between the engaging projection 36, 46 and the engaged recess 23. Specifically, the length of the receiver 50 is set such that, when a relative movement between the first unit 25A, 25B and the second unit 37A, 37B that is allowed by the clearance between the engaging projection 36, 46 and the engaged recess 23 is the largest, the connection member 21, 22 is not exposed to the single cell 11 side.

As a result, the first base plate 27, 31 that extends to the second base plate 39, 43 side and the second base plate 39, 43 that extends to the first base plate 27, 31 side prevent the connection member 21, 22 from being exposed to the single cell 11 side in an area between the first base plate 27, 31 and the second base plate 39, 43.

Next, attachment of the cell wiring module 20 is described.

First, as illustrated in FIG. 8, the first units 25A, 25B and the second units 37A, 37B are arranged and combined (fitted to each other) such that the ends 49 of the first base plates 27, 31, second base plates 39, 43 and the first dividing walls 32, 33, second dividing walls 44, 45 on one side of the first units 25A, 25B and second units 37A, 37B are received by the receivers 50 that are formed on ends of the first base plates 27, 31, second base plates 39, 43 and the first dividing walls 32, 33, second dividing walls 44, 45 on the other side. Then, the plurality of the connection members 21, 22 are held by the holders 26, 30, 38, 42 and the housing part 29, and the voltage detection terminals on which the electric wire for voltage detection is crimped are stacked and installed on the connection members 21, 22. Thus, the cell wiring module 20 is formed (FIG. 2).

Next, the openings 28, 40 of the cell wiring module 20 are fitted to the electrode terminals 13A, 13B of the bank of single cells 12 to perform positioning.

In this case, even when, due to variation in dimensional precision of the single cells 11, errors occur in gaps between the electrode terminals 13A, 13B that serve as a reference for positioning, the first units 25A, 25B and the second units 37A, 37B slide relative to each other in the connection direction of the connection member 21, 22 for a distance range corresponding to the clearance that is created in the connection direction of the connection members 21, 22 by the engaging projections 36 and the engaged recess 23.

In this way, the first units 25A, 25B and the second units 37A, 37B move relative to each other via the connection members 21, 22. Therefore, the first base plates 27, 31 and the second base plates 39, 43 can move in a direction in which butting (fitted) ends (the ends 49 and the receiver 50) move away from each other. However, even in this case, the length (extension length) of the receiver 50 in the left-right direction is a length corresponding to the clearance created by the engaged recess 23 and the engaging projections 36, 46 (the length of the receiver is more than total clearance). Therefore, the connection member 21, 22 at a boundary area between the first base plate 27, 31 and the second base plate 39, 43 is covered by the receiver 50 with respect to the single cell 11 side and thus the connection member 21, 22 is not exposed to the single cell 11 side.

After the cell wiring module 20 is positioned with respect to the single cells 11, a shaft portion of a bolt is inserted through each of the through holes 21A, 22A of the connection members 21, 22, and the connection members 21, 22 are fastened to the electrode terminals 13A, 13B by bolts. In this case, the through holes 21A, 22A each have an oval shape that is long in the left-right direction. Therefore, errors in dimensional precision of the distances between the electrode terminals 13A, 13B can also be absorbed by the oval-shaped through holes 21A, 22A. After the fastening by bolts is performed, a cover made of synthetic resin (not illustrated in the drawings) is used to cover an upper surface of the cell wiring module. As a result, the battery module 10 is formed.

According to the present embodiment, the following operation and effects are achieved.

(1) A cell wiring module 20 is provided to be attached to a bank of single cells 12 that is configured by arranging a plurality of single cells 11 each of which has electrode terminals 13A, 13B including a positive electrode and a negative electrode. The cell wiring module 20 includes a connection member 21, 22 that connects the electrode terminals 13A, 13B of adjacent single cells 11; a first unit 25A, 25B that holds one side of the connection member 21, 22 in a connection direction on a first base plate 27, 31 that extends along the connection member 21, 22; and a second unit 37A, 37B that holds the other side of the connection member 21, 22 in the connection direction on a second base plate 39, 43 that extends along the connection member 21, 22. Sliding occurs in the connection direction of the connection member 21, 22 between the connection member 21, 22 and at least one of the first unit 25A, 25B and the second unit 37A, 37B, and the first base plate 27, 31 that extends to a second base plate 39, 43 side and the second base plate 39, 43 that extends to a first base plate 27, 31 side extend to such positions that the connection member 21, 22 is not exposed on an single cell 11 side in an area between the first base plate 27, 31 and the second base plate 39, 43.

According to the present embodiment, even when a dimensional error occurs between the single cells 11 and the cell wiring module 20, since sliding occurs in the connection direction of the connection member 21, 22 between the connection member 21, 22 and at least one of the first unit 25A, 25B and the second unit 37A, 37B, the dimensional error between the single cells 11 and the cell wiring module 20 can be absorbed by the sliding (slide displacement) between the connection member 21, 22 and at least one of the first unit 25A, 25B and the second unit 37A, 37B. Therefore, a problem that may occur due to a dimensional error and the like when attaching the cell wiring module 20 to the single cells 11 can be prevented. Further, in this configuration, the dimensional error is not absorbed only by configurations of the first unit and the second unit. Therefore, as compared to a case where a configuration for absorbing the dimensional error is provided only in the first unit and the second unit, loss of strength of the first unit and the second unit can be inhibited.

Further, the first base plate 27, 31 that extends to the second base plate 39, 43 side and the second base plate 39, 43 that extends to the first base plate 27, 31 side extend with respect to each other to such positions that the connection member 21, 22 is not exposed to the single cell 11 side. Therefore, deterioration in insulation performance due to exposure of the connection member 21, 22 to the single cell 11 side can be prevented.

(2) A receiver 50 is formed on one of the first base plate 27, 31 and the second base plate 27, 31 for receiving the other one of the first base plate 27, 31 and the second base plate 39, 43 from the single cell 11 side.

In this way, the single cell 11 side of the connection member 21, 22 can be insulated with a simple configuration. Further, even when sliding occurs between the connection member 21, 22 and at least one of the first unit 25A, 25B and the second unit 37A, 37B in a direction in which the first base plate 27, 31 and the second base plate 39, 43 move away from each other, for a range in which the receiver 50 overlaps the connection member 21, 22 in the connection direction, the connection member 21, 22 can be prevented from being exposed to the single cell 11 side. Therefore, deterioration in insulation performance due to exposure of the connection member 21, 22 to the single cell 11 side can be inhibited.

(3) A pair of opposing walls 32A, 33A, 44A, 45A are formed from both side edges of each of the base plates 27, 31, 39, 43, and the connection member 21, 22 is arranged between the pair of the opposing walls 32A, 33A, 44A, 45A.

In this way, with the pair of the opposing walls 32A, 33A, 44A, 45A, insulation of the connection member 21, 22 from the outside can be reliably performed.

(4) An engaged recess 23 (engaged portion) is provided on the connection member 21, 22, and an engaging projection 36, 46 (engaging portion) is provided on at least one of the first unit 25A, 25B and the second unit 37A, 37B for engaging the engaged recess 23 with a predetermined clearance in the connection direction of the connection member 21, 22.

For example, after the units 25A, 25B, 37A, 37B are fixed to the single cells 11 by parts other than the connection member 21, 22, the connection member 21, 22 can slide (slide displacement) within a range of the predetermined clearance. Therefore, even when a dimensional error occurs, since the connection member 21, 22 can be moved within the range of the predetermined clearance in the connection direction, work for attaching the connection member 21, 22 can be easily performed.

(5) An opening 28, 40 (positioner) is provided on the first unit 25A, 25B and the second unit 37A, 37B for positioning with respect to the single cells 11.

The opening 28, 40 allows positions of the first unit 25A, 25B and the second unit 37A, 37B to be set with respect to the single cells 11. Therefore, with these positions as a reference, a dimensional error occurring between the single cells 11 and the units 25A, 25B, 37A, 37B can be absorbed by the sliding between the first unit 25A, 25B and the second unit 37A, 37B and the connection member 21, 22. Therefore, the connection member 21, 22 can be fastened after the dimensional error is resolved by the sliding during the positioning.

(6) A fitting projection 47 projecting in the connection direction of the connection member 21, 22 is provided on one of the first unit 25A, 25B and the second units 37A, 37B, and a fitting recess 48 to be fitted with the fitting projection 47 is provided on the other one of the first unit 25A, 25B and the second units 37A, 37B.

In this way, by fitting the fitting projection 47 and the fitting recess 48 with each other, positioning and inhibiting flexible deformation between the units 25A, 25B, 37A, 37B can be easily performed.

(7) The connection member 21, 22 is fixed to the single cells 11 by inserting into the through hole 21A, 22A a shaft portion of a bolt. The through hole 21A, 22A has a shape of an oval that is long in the connection direction of the connection member 21, 22.

The through hole 21A, 22A of the connection member 21, 22 has a shape of an oval that is long in the connection direction of the connection member 21, 22. Therefore, even when there is a dimensional error due to variation in dimensional precision between the electrode terminals 13A, 13B, it is possible to absorb the dimensional error and insert the shaft portion of the bolt into the through hole 21A, 22A of the connection member 21, 22.

(8) The plurality of the single cells 11 have a flat shape and are arranged in the left-right direction (a long axis direction in a plane having the electrode terminals 13A, 13B), and the connection member 21, 22 connects adjacent electrode terminals 13A, 13B in the left-right direction (long axis direction).

For the long axis direction of the single cells 11, since variation in dimensional precision is particularly likely to occur due to a length in that direction, a dimensional error between the plurality of the single cells 11 and the cell wiring module 20 is likely to become large. However, according to the present embodiment, in a case where such a dimensional error is likely to occur, a problem due to the dimensional error can be prevented.

(9) The plurality of the single cells 11 are also arranged in the front-rear direction (short axis direction in the plane having the electrode terminals 13A, 13B), and the connection member 21, 22 connects the electrode terminals 13A, 13B arranged in the front-rear direction (the short axis direction in the plane having the electrode terminals 13A, 13B).

In this way, a degree of freedom in connecting the plurality of the single cells 11 can be increased.

Other Embodiments

The present invention is not limited to the above description and the embodiment described using the drawings. For example, embodiments such as the following are also included in the technical scope of the present invention.

(1) In the above embodiment, the receiver 50 receiving the end 49 is provided. However, it is also possible that such a receiver 50 is not provided. It is sufficient that at least the first base plate 27, 31 and the second base plate 39, 43 extend relative to each other to such positions that the connection member 21, 22 is not exposed to the single cell 11 side. For example, it is also possible to have a configuration in which, without providing the receiver, one of the first base plate and the second base plate overlaps the other (in the range of the clearance).

(2) In the above embodiment, the receiver 50 is provided on the base plate 27, 31, 39, 43 and the dividing wall 32, 33, 44, 45. However, the present invention is not limited to this. It is also possible that the receiver is not provided on the dividing wall 32, 33, 44, 45, but only on the base plate 27, 31, 39, 43.

(3) In the above embodiment, the engaged recess 23 and the engaging projection 36, 46 are provided on both the first unit 25A, 25B and the second unit 37A, 37B. However, the present invention is not limited to this. It is also possible to provide the engaged recess 23 and the engaging projection 36 on one of the first unit 25A, 25B and the second unit 37A, 37B. Even in this case, by the clearance due to the engaging projection 36, 46 and the engaged recess 23 that are provided on at least one of the units, a problem can be prevented from occurring when attaching the cell wiring module 20 to the single cells 11.

(4) It is also possible to have a configuration in which, without providing the engaged recess 23 and the engaging projection 36, 46, the connection member 21, 22 can slide relative to the units 25A, 25B, 37A, 37B (regardless of a clearance).

(5) In the configuration of the above embodiment, each of the electrode terminals 13A, 13B of the single cells 11 is in a form of a nut and is fastened by using a bolt of a separate member. However, the present invention is not limited to this. It is also possible to have a configuration in which an electrode terminal has a rod-shaped shaft portion that has a threaded groove on an outer peripheral surface and the connection member 21, 22 is fixed on the single cells 11 by fastening a nut of a separate member. In this case, the shaft portion of the electrode terminal is inserted through the through hole 21A, 22A of the connection member 21, 22.

(6) In the above embodiment, a case where the plurality of the single cells 11 are connected in series is described. However, the present invention is not limited to this, but is also applicable to a case where the plurality of the single cells 11 are connected in parallel.

(7) The number of the single cells 11 that configure the battery module 10 is not limited to the number in the above embodiment. Further, according to the number of the single cells 11, the shape of the cell wiring module 20 may also be set as desired.

(8) In the above embodiment, a plurality of the openings 28, 40 (positioners) are provided for determining reference positions with respect to the first units 25A, 25B and the second units 37A, 37B. However, it is also possible to determine a reference position using any one of the positioners for each of the units 25A, 25B, 37A, 37B, and form the other positioners of the units 25A, 25B, 37A, 37B within a predetermined dimensional tolerance range with respect to the positioner that is used as a reference. Further, the present invention is not limited to a configuration in which a plurality of positioners are provided for each of the units 25A, 25B, 37A, 37B. It is also possible to provide only one positioner for each of the units 25A, 25B, 37A, 37B.

(9) In the above embodiment, position with respect to the single cells 11 is performed using the opening 28, 40. However, the present invention is not limited to this. It is also possible to provide a positioner for positioning with respect to the single cells 11 at another part of each of the units.

DESCRIPTION OF REFERENCE NUMERALS

10: battery module
11: single cell
12: bank of single cells
13A, 13B: electrode terminal
20: cell wiring module
21: short connection member (connection member)
22: long connection member (connection member)
23: engaged recess (engaged portion)
24: holder member
25A, 25B: first unit
26, 30: first holder
27, 31: first base plate
28, 40: opening (positioner)
32, 33: first dividing wall
32A, 33A: opposing wall
34: separation regulating piece
36, 46: engaging projection (engaging portion)
37A, 37B: second unit
38, 42: second holder
39, 43: second base plate
44, 45: second dividing wall
44A, 45A: opposing wall
47: fitting projection
48: fitting recess
49: end
50: receiver

The invention claimed is:

1. A cell wiring module attached to a bank of single cells, the bank of single cells having a plurality of single cells having positive and negative electrode terminals, the cell wiring module comprising:
a plurality of connection members, wherein each of the connection members is plate-shaped and has a length corresponding to a spacing between adjacent electrode terminals, and wherein each of the connecting members connect the electrode terminals of adjacent single cells;
a first holder defined by first holding portions, the first holder having a first base plate provided by individual base plates of each of the first holding portions, wherein the first holder receives insertion of a first end of a respective connection member in a connection direction on the first base plate that extends along the respective connection member, wherein the first holder receives insertion of first ends of at least two respective connection members such that the at least two respective connection members are oriented to extend perpendicular to each other, and wherein each of the connection members are spaced apart from each other; and
a second holder defined by second holding portions, the second holder having a second base plate provided by individual base plates of each of the second holding portions, wherein the second holder receives insertion of a second end of the respective connection member in the connection direction on the second base plate that extends along the respective connection member, wherein the second holder receives insertion of second ends of the at least two respective connection members,
wherein none of the first holding portions that define the first holder are among the second holder portions that define the second holder,
and wherein
the first holder and the second holder are coupled together such that sliding occurs in the connection direction of the respective connection member between the respective connection member and at least one of the first holder and the second holder,
the first base plate extends to a second base plate side and the second base plate extends to a first base plate side to positions such that a portion of the first base plate and a portion of the second base plate overlap such that the respective connection member is not exposed on an single cell side in an area between the first base plate and the second base plate, wherein at least one receiver is formed on one of the first base plate and the second base plate, the at least one receiver receiving at least one end of the other one of the first base plate and the second base plate so as to connect the first holding portions and second holding portions.

2. The cell wiring module according to claim 1, wherein a pair of opposing walls are formed from both side edges of each of the first and second base plates, and the connection member is arranged between the pair of the opposing walls.

3. The cell wiring module according claim 1, wherein each of the connection members is provided with an engaged portion, and at least one of the first holder and the second holder is provided with an engaging portion that engages with the engaged portion having a predetermined clearance in the connection direction of a respective one of the connection members.

4. The cell wiring module according to claim 1, wherein the first holder and the second holder are provided with a positioner configured to position with respect to the single cells.

5. The cell wiring module according to claim 1, wherein one of the first holder and the second holder is provided with a fitting projection that projects in the connection direction of a respective one of the connection members, and the other one of the first holder and the second holder is provided with a fitting recess configured to be fitted with the fitting projection.

6. The cell wiring module according to claim 1, wherein each of the connection members is fixed to the single cells by inserting a rod-shaped terminal or a shaft portion of a bolt into a through hole, the through hole having a shape of an oval that is long in the connection direction of each connection member.

7. The cell wiring module according to claim 1, wherein the plurality of the single cells have a flat shape and are arranged in a long axis direction in a plane having the electrode terminals, and each of the connection members connect adjacent electrode terminals in the long axis direction.

8. The cell wiring module according to claim 7, wherein the plurality of the single cells are also arranged in a short axis direction in the plane having the electrode terminals, and a respective one of the connection members connects the electrode terminals arranged in the short axis direction.

9. The cell wiring module according to claim 1, further comprising:

the first and second holders being oriented in a plane, wherein the plane, in which the first and second holders are oriented, is interposed between the electrode terminals and plurality of connection members in a protruding direction of the electrode terminals.

* * * * *